(12) United States Patent
Yun

(10) Patent No.: US 8,982,348 B2
(45) Date of Patent: Mar. 17, 2015

(54) LIGHT SOURCE CLASSIFICATION SYSTEM AND METHOD

(71) Applicant: Samsung Electronics Co., Ltd., Suwon-si, Gyeonggi-do (KR)

(72) Inventor: Sang Bok Yun, Suwon (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 229 days.

(21) Appl. No.: 13/707,354

(22) Filed: Dec. 6, 2012

(65) Prior Publication Data

US 2013/0141725 A1    Jun. 6, 2013

(30) Foreign Application Priority Data

Dec. 6, 2011    (KR) ........................ 10-2011-0129674

(51) Int. Cl.
*G01J 3/46*    (2006.01)
*G01J 3/50*    (2006.01)

(52) U.S. Cl.
CPC .. *G01J 3/46* (2013.01); *G01J 3/462* (2013.01); *G01J 3/505* (2013.01)
USPC ........................................... 356/402

(58) Field of Classification Search
USPC .................................. 356/402–425
See application file for complete search history.

(56) References Cited

U.S. PATENT DOCUMENTS 4,974,017 A * 11/1990 Terashita ........................ 355/38

FOREIGN PATENT DOCUMENTS

JP    2004-004036 A    1/2004
JP    2009-123758 A    6/2009

* cited by examiner

*Primary Examiner* — Abdullahi Nur
(74) *Attorney, Agent, or Firm* — McDermott Will & Emery LLP

(57) ABSTRACT

A method of light source classification includes determining a plurality of color regions in the CIE 1976 chromaticity diagram according to desired classification criteria. The plurality of color regions of the CIE 1976 chromaticity diagram are converted into a plurality of color classification regions defined by color coordinates of the CIE 1931 chromaticity diagram. The light source is classified into one of the plurality of color classification regions. This classification method may allow for precise classification based on actual color differences, while providing light sources having color uniformity in the same classification region.

20 Claims, 6 Drawing Sheets

LIGHT SOURCE CLASSIFICATION SYSTEM AND METHOD

CROSS-REFERENCE TO RELATED APPLICATIONS

This application claims priority to Korean Patent Application No. 10-2011-0129674 filed on Dec. 6, 2011, in the Korean Intellectual Property Office, the disclosure of which is incorporated herein by reference.

BACKGROUND

1. Field of the Disclosure

The present disclosure relates to a classification system and method for light sources, and more particularly, to a classification system and method for light sources such as light emitting diodes (LEDs) and the like based on color differences.

2. Background

Various light sources, such as illuminating light sources and the like, may be classified as desired into categories according to characteristics of light emitted therefrom. For example, light sources for illumination may be classified into light sources having different color regions according to color characteristics of light emitted therefrom.

In particular, even in a case in which white light emitting devices are manufactured to produce monochromatic white light, they may emit light of different colors, depending on differences in color temperature or the like due to inevitable errors occurring during the manufacturing process. Such color differences may be used to classify light sources as being within corresponding color regions, according to color differences of light emitted from individual light sources, based on classification regions of the CIE chromaticity diagram.

However, even in the case that light sources are classified based on classification regions of the chromaticity diagram by measuring the characteristics of light emitted therefrom, light sources belonging to the same classification region may exhibit substantially different color properties.

SUMMARY OF THE DISCLOSURE

An aspect of the present disclosure provides a light source classification method capable of effectively reducing color differences.

An aspect of the present disclosure provides a system and method of light source classification including: determining a plurality of color regions in a CIE 1976 chromaticity diagram according to desired classification criteria; determining a plurality of color classification regions corresponding to the plurality of color regions through coordinate conversion, thereby allowing the plurality of color regions of a CIE 1976 chromaticity diagram to be converted into the plurality of color classification regions defined by color coordinates of the CIE 1931 chromaticity diagram; measuring CIE 1931 color coordinates of light emitted from a light source to be classified; and classifying the light source based on one of the plurality of color classification regions, in which the measured CIE 1931 color coordinates are located.

The determining of the plurality of color classification regions may include converting coordinates (u', v') defining each of the color regions of the CIE 1976 chromaticity diagram into coordinates (x, y) of the CIE 1931 chromaticity diagram based on equations (1) and (2):

$$u' = \frac{4X}{X+15Y+3Z} = \frac{4x}{-2x+12y+3} \quad \text{Equation (1)}$$

$$v' = \frac{9Y}{X+15Y+3Z} = \frac{9y}{-2x+12y+3} \quad \text{Equation (2)}$$

wherein X, Y, and Z are coordinates of the color of the CIE 1931 chromaticity diagram.

The determining of the plurality of color regions in the CIE 1976 chromaticity diagram may include setting variations (Δu', Δv') in coordinates to range from 0.001 to 0.05 in the same color region.

Each of the plurality of color regions may be subdivided into a plurality of sub-color regions, and each of the plurality of color classification regions may be subdivided into a plurality of sub-color classification regions corresponding to the plurality of sub-color regions.

The light source may be a white LED device. The white LED device may include at least one LED chip emitting light having a first wavelength, and a wavelength conversion material converting the light having the first wavelength into light having a second wavelength.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Various examples of the present disclosure will now be described in detail with reference to the accompanying drawings.

Figure 1:
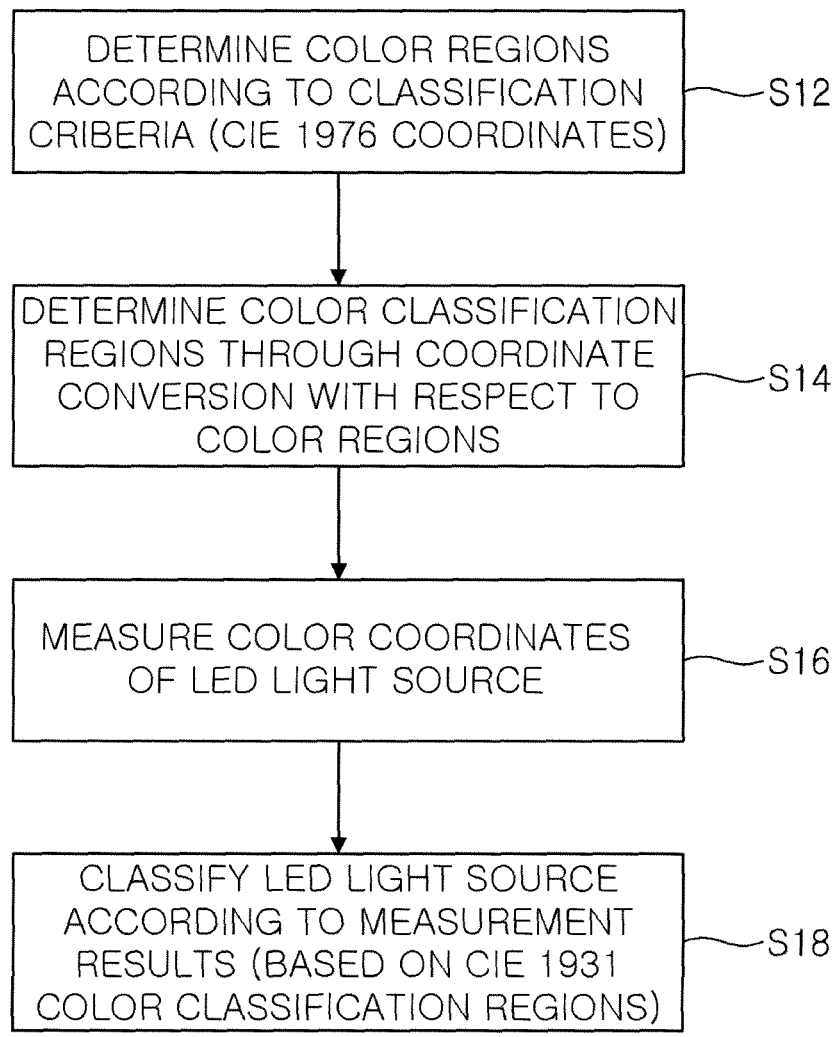
FIG. 1 is a flowchart illustrating a classification method for light emitting diode (LED) devices according to an example of the present disclosure.

FIG. 1 is a flowchart illustrating a classification method for light emitting diode (LED) devices according to an example of the present disclosure.

In a light source classification method according to an example of the present disclosure, a plurality of color regions may be determined based on desired criteria for classification of light sources in the CIE 1976 chromaticity diagram in operation S12.

While the CIE 1931 chromaticity diagram, commonly used as the standard for the classification of light sources, is based on the brightness of light, the CIE 1976 chromaticity diagram adopted in operation S12 is based on luminosity levels able to be sensed by humans, that is, actual visible light colors.

In the case of the CIE 1931 chromaticity diagram, a green region having the greatest influence on the brightness of light is set to have the largest area and a blue region having the least influence on the brightness of light is set to have the smallest area. However, in the case of the CIE 1976 chromaticity diagram, the green region is relatively reduced and the blue region is increased so that classification criteria close to an actual luminosity level may be provided.

In operation S12, the plurality of color regions may be determined according to desired criteria for classification of light sources close to actual luminosity levels provided in the CIE 1976 chromaticity diagram. When the plurality of color regions are determined in the CIE 1976 chromaticity diagram, variations (Δu', Δv') in coordinates within the same region may be set to be 0.05 or less in order to minimize color differences within the same region.

However, in a case in which the variations are excessively low, precise classification may be difficult due to measurement errors. Therefore, the variations (Δu', Δv') in coordinates within the same region may be set to be 0.001 or greater. As such, in an example of the present disclosure, variations in coordinates may be set in a range of 0.001 to 0.05 in the same color region.

Then, the plurality of color regions of the CIE 1976 chromaticity diagram may be correspondingly converted into a plurality of color classification regions of the CIE 1931 chromaticity diagram through coordinate conversion in operation S14.

That is, the plurality of color regions determined in the CIE 1976 chromaticity diagram according to the classification criteria are reflected in the CIE 1931 chromaticity diagram using a coordinate conversion equation. Coordinates actually obtained by a measurement device are based on the CIE 1931 chromaticity diagram. Therefore, the CIE 1931 chromaticity diagram may be adopted in order to use actually measured coordinates of light emitted from a light source.

Coordinates (u', v') defining color regions of the CIE 1976 chromaticity diagram may be converted into coordinates (x, y) defining color regions of the CIE 1931 chromaticity diagram using the following equations (1) and (2), such that a plurality of color classification regions may be definitely determined. Here, X, Y and Z denote the coordinates of the color of the CIE 1931 chromaticity diagram.

$$u' = \frac{4X}{X+15Y+3Z} = \frac{4x}{-2x+12y+3} \quad \text{Equation (1)}$$

$$v' = \frac{9Y}{X+15Y+3Z} = \frac{9y}{-2x+12y+3} \quad \text{Equation (2)}$$

These coordinate conversions will be described with reference to FIGS. 2 and 3.

Figure 2:
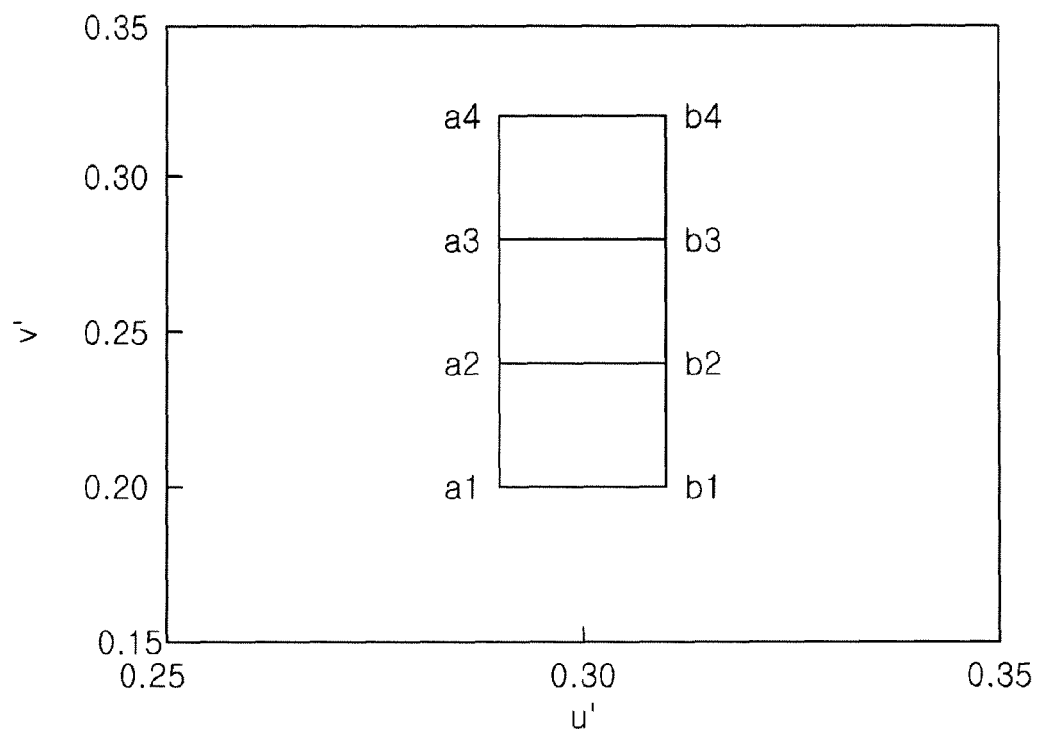
FIGS. 2 and 3 depict the CIE 1976 chromaticity diagram and the CIE 1931 chromaticity diagram for illustrating color coordinate conversion.

With reference to FIG. 2, as described in operation S12, three color regions are determined according to desired classification criteria. Here, each color region may be defined by two iso-u' lines and two iso-v' lines.

Figure 3:
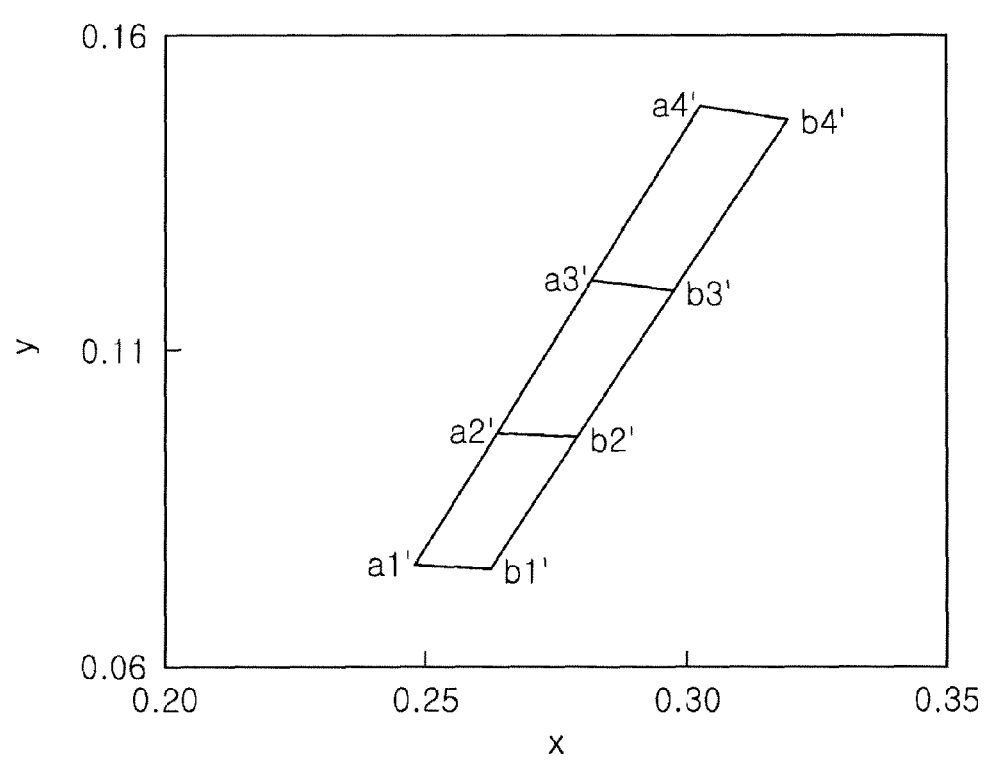

Coordinates (a1-a4, b1-b4) of respective corners of color regions expressed in the CIE 1976 chromaticity diagram of FIG. 2 may be converted into coordinates (a1'-a4', b1'-b4') of the CIE 1931 chromaticity diagram based on equations (1) and (2), such that color classification regions may be determined as shown in FIG. 3.

The color classification regions defined in the chromaticity diagram of FIG. 3 are expressed based on the CIE 1931 chromaticity diagram; however, those are to be construed as being based on the CIE 1976 chromaticity diagram in consideration of luminosity levels.

Then, coordinates of light emitted from a light source to be classified may be measured using the CIE 1931 chromaticity diagram in operation S16, and the light source may be classified based on a color classification region in which the measured color coordinates are located in operation S18.

The measurement device is substantially based on the CIE 1931 chromaticity diagram measured in consideration of the brightness of light. Therefore, the classification criteria are converted into the coordinates of the CIE 1931 chromaticity diagram in the preceding operation S16, such that the light source may be directly classified based on the color coordinates thereof obtained by the measurement device.

Types of light sources to which the classification method according to the example of the present disclosure is applicable are not particularly limited. However, this classification method may be useful and important for white light emitting devices in terms of determination of color differences. In particular, the classification method may provide criteria for precise classification based on color differences which may be variable according to a distribution of wavelength conversion materials such as phosphors and/or quantum dots or wavelength characteristics of a LED chip in a white LED device.

Figure 7:
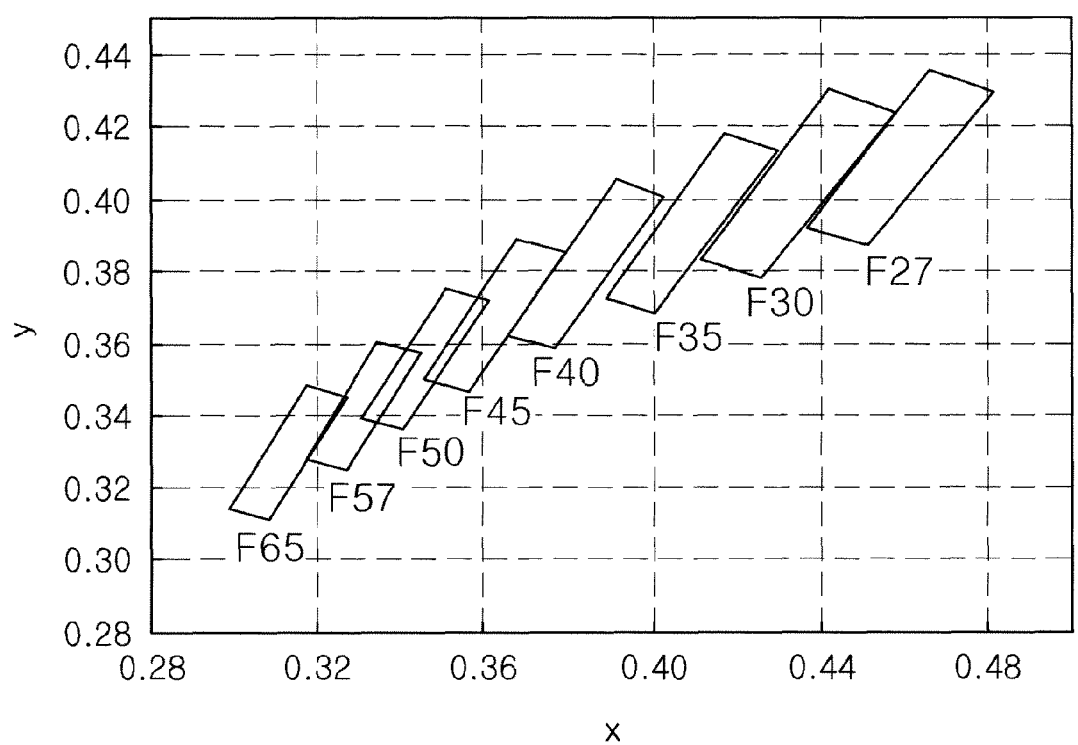

In general, a measurement device for classifying color coordinate characteristics measures light sources using the CIE 1931 chromaticity diagram in such a manner that it determines classification regions in the CIE 1931 chromaticity diagram according to desired classification criteria such as color temperature and a black body locus, and classifies measured light sources based on the classification regions. In this case, coordinates obtained by the measurement device correspond to coordinates of the CIE 1931 chromaticity diagram, so that classification may be facilitated. However, since the CIE 1931 chromaticity diagram is based on the brightness of light, a green region having the greatest influence on the brightness of light is set to have the largest area, while a blue region having the least influence on the brightness of light is set to have the smallest area, as illustrated in FIG. 7.

Accordingly, the light sources may be classified while being less sensitive to the influence of the blue region. Even in the case that the light sources are located within the same color classification region, they may exhibit large color differences in consideration of luminosity levels able to be sensed by humans. Therefore, appropriate classification may not be implemented.

In order to alleviate such a problem, color regions are set in the CIE 1976 chromaticity diagram in consideration of luminosity levels able to be sensed by humans, and are then converted into color coordinates of the CIE 1931 chromaticity diagram according to measurement criteria to thereby determine classification regions. Therefore, this classification method may allow for precise classification based on actual color differences, while providing light sources having color uniformity in the same classification region.

The light sources may be white LED devices, especially white LED devices including at least one LED chip emitting light having a first wavelength and a wavelength conversion material converting the light having the first wavelength into light having a second wavelength.

Figure 4:
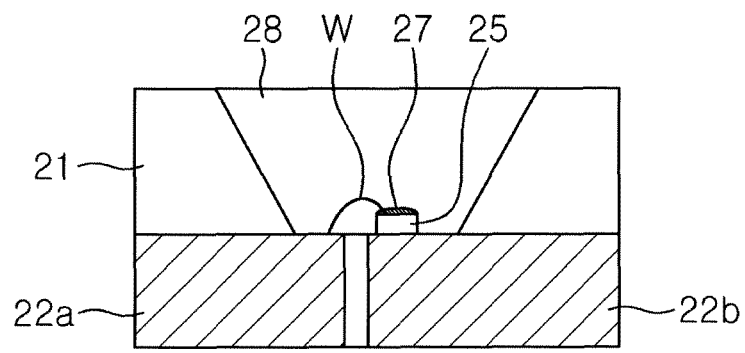
FIGS. 4 and 5 illustrate examples of white LED devices adopting a light source classification method according to an example of the present disclosure.
Figure 5:
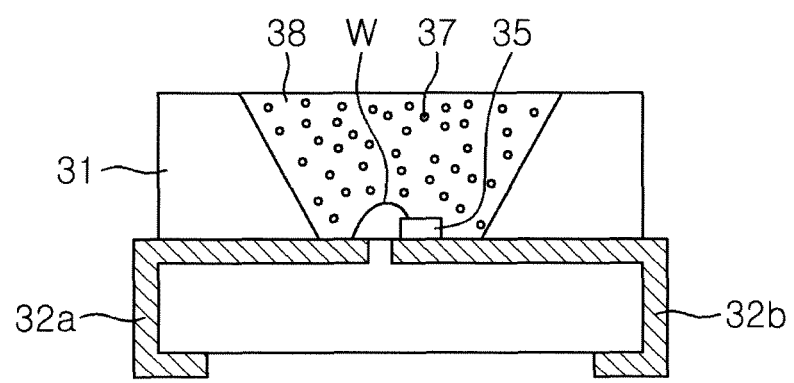

FIGS. 4 and 5 illustrate examples of white LED devices advantageously adopting a light source classification method according to an example of the present disclosure.

A white LED device 20 in FIG. 4 includes lead frames 22a and 22b, a package body 21 combined with the lead frames 22a and 22b, and an LED chip 25 electrically connected to the lead frames 22a and 22b.

In the white LED device 20, the package body 21 may be formed of resin manufactured by injection molding so as to fix the lead frames 22a and 22b. Here, the lead frames 22a and 22b may be exposed through a lower surface of the package body 21 to facilitate thermal emission. The LED chip 25 may be electrically connected to the lead frame 22a using a wire, and may be enclosed by a resin encapsulating part 28.

As shown in FIG. 4, a wavelength conversion layer 27 is formed on an upper surface of the LED chip 25. The wavelength conversion layer 27 may include at least one wavelength conversion material such as phosphors or quantum dots so as to convert at least a portion of light emitted from the LED chip 25 into light having a different wavelength therefrom. This wavelength conversion may allow the white LED device 20 to produce white light.

A white LED device 30 in FIG. 5 includes lead frames 32a and 32b, a package body 31 combined with the lead frames 32a and 32b, and an LED chip 35 electrically connected to the lead frames 32a and 32b.

Unlike the structure of the package body shown in FIG. 4, the package body 31 may be formed to fix the lead frames 32a and 32b, while allowing the lead frames 32a and 32b to remain unexposed through a lower portion thereof. The LED chip 35 may be electrically connected to the lead frame 32a using a wire.

In the present example shown in FIG. 5, a resin encapsulating part 38 including a wavelength conversion material may enclose the LED chip 35.

In the white LED devices as shown in FIGS. 4 and 5, color distribution of white light may be generated due to variations in each product such as variations in manufacturing a wavelength conversion material such as contents or distribution of the wavelength conversion material or location of the wavelength conversion material and differences in peak wavelengths of the LED chips 25 and 35, and thus, it is necessary to classify the devices according to appropriate criteria for color classification. In this case, the classification method according to the example of the present disclosure may be useful so as to appropriately classify light sources in consideration of actual light colors.

Figure 6:
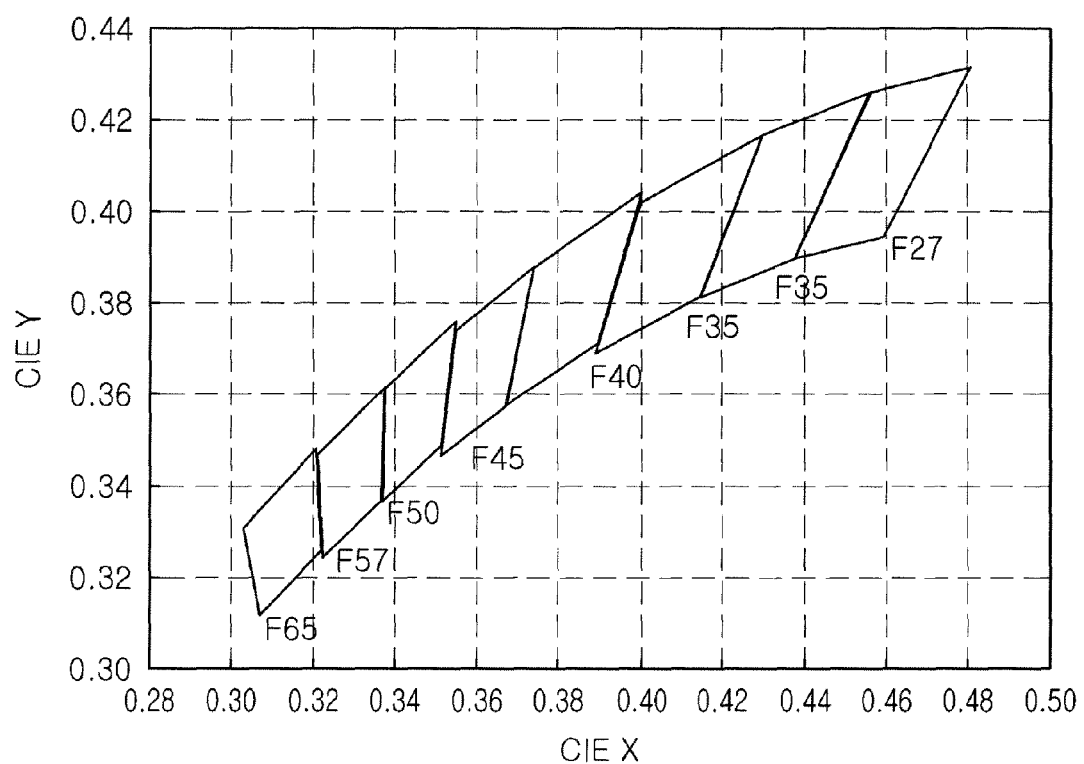
FIGS. 6 and 7 depict the CIE 1931 chromaticity diagram according to the standard of the United States Department of Energy (DOE) and the CIE 1931 chromaticity diagram according to an example of the present disclosure, respectively.

FIGS. 6 and 7 illustrate the CIE 1931 chromaticity diagram according to the standard of the United States Department of Energy (DOE) and the CIE 1931 chromaticity diagram according to an example of the present disclosure, respectively.

FIG. 6 shows the CIE 1931 chromaticity diagram for illuminating light sources according to the DOE standard. This chromaticity diagram includes eight color classification regions F27 to F65. Here, F27 refers to a color classification region corresponding to a color temperature of 2700K. The existing color classification regions may be represented as shown in Table 1 below.

TABLE 1

| CCT | CIE x | CIE y |
|---|---|---|
| 6500K | 0.3093 | 0.2993 |
| | 0.3231 | 0.3120 |
| | 0.3196 | 0.3602 |
| | 0.3005 | 0.3415 |
| 5700K | 0.3231 | 0.3120 |
| | 0.3361 | 0.3245 |
| | 0.3381 | 0.3762 |

TABLE 1-continued

| CCT | CIE x | CIE y |
|---|---|---|
| | 0.3196 | 0.3602 |
| 5000K | 0.3361 | 0.3245 |
| | 0.3495 | 0.3339 |
| | 0.3571 | 0.3907 |
| | 0.3381 | 0.3762 |
| 4500K | 0.3495 | 0.3339 |
| | 0.3640 | 0.3440 |
| | 0.3771 | 0.4034 |
| | 0.3571 | 0.3907 |
| 4000K | 0.3670 | 0.3578 |
| | 0.3898 | 0.3716 |
| | 0.4006 | 0.4044 |
| | 0.3736 | 0.3874 |
| 3500K | 0.3889 | 0.3690 |
| | 0.4147 | 0.3814 |
| | 0.4299 | 0.4165 |
| | 0.3996 | 0.4015 |
| 3000K | 0.4147 | 0.3814 |
| | 0.4373 | 0.3893 |
| | 0.4562 | 0.4260 |
| | 0.4299 | 0.4165 |
| 2700K | 0.4373 | 0.3893 |
| | 0.4593 | 0.3944 |
| | 0.4813 | 0.4319 |
| | 0.4562 | 0.4260 |

With reference to FIG. 6, boundaries among the color classification regions may coincide with or be parallel to color temperature lines and may be divided based on a black body locus. Since the chromaticity diagram of FIG. 6 is based on the brightness of light, actual light colors may be different even in the same color classification region.

In particular, since the blue region is very narrow in the CIE 1931 chromaticity diagram, actual light colors may be different even in the same color classification region close to the blue region.

On the other hand, the CIE 1931 chromaticity diagram of FIG. 7 includes color classification regions in consideration of color differences. That is, color regions are set in the CIE 1976 chromaticity diagram in consideration of luminosity levels according to color differences, and then coordinate conversion thereof is performed to thereby determine classification regions of the CIE 1931 chromaticity diagram. Table 2 shows color coordinates of the converted classification regions of the CIE 1931 chromaticity diagram.

TABLE 2

| RANK | CIE x | CIE y |
|---|---|---|
| 6500K | 0.2992 | 0.3139 |
| | 0.3090 | 0.3114 |
| | 0.3277 | 0.3453 |
| | 0.3175 | 0.3484 |
| 5700K | 0.3169 | 0.3279 |
| | 0.3268 | 0.3253 |
| | 0.3446 | 0.3577 |
| | 0.3343 | 0.3607 |
| 5000K | 0.3305 | 0.3395 |
| | 0.3405 | 0.3366 |
| | 0.3610 | 0.3721 |
| | 0.3507 | 0.3755 |
| 4500K | 0.3452 | 0.3502 |
| | 0.3563 | 0.3468 |
| | 0.3791 | 0.3851 |
| | 0.3675 | 0.3891 |
| 4000K | 0.3650 | 0.3618 |
| | 0.3764 | 0.3582 |
| | 0.4027 | 0.4008 |
| | 0.3908 | 0.4051 |
| 3500K | 0.3882 | 0.3724 |
| | 0.4004 | 0.3683 |

TABLE 2-continued

| RANK | CIE x | CIE y |
|------|-------|-------|
|      | 0.4296 | 0.4134 |
|      | 0.4168 | 0.4183 |
| 3000K | 0.4116 | 0.3831 |
|      | 0.4261 | 0.3780 |
|      | 0.4575 | 0.4243 |
|      | 0.4423 | 0.4305 |
| 2700K | 0.4364 | 0.3921 |
|      | 0.4508 | 0.3868 |
|      | 0.4810 | 0.4296 |
|      | 0.4661 | 0.4358 |

The color classification regions of FIGS. 6 and 7 are slightly different in terms of widths and shapes of the regions. FIG. 6 may fail to reflect color differences even in the case that the measured color coordinates are present in the same color classification region of the CIE 1931 chromaticity diagram. On the other hand, the color classification regions of FIG. 7 may be determined as regions close to actual light colors by overcoming the above-mentioned problem.

As shown in FIG. 7, boundaries among the color classification regions of the CIE 1931 chromaticity diagram do not coincide with or are not parallel to color temperature lines or a black body locus, unlike the existing color classification regions of FIG. 6.

Figure 8:
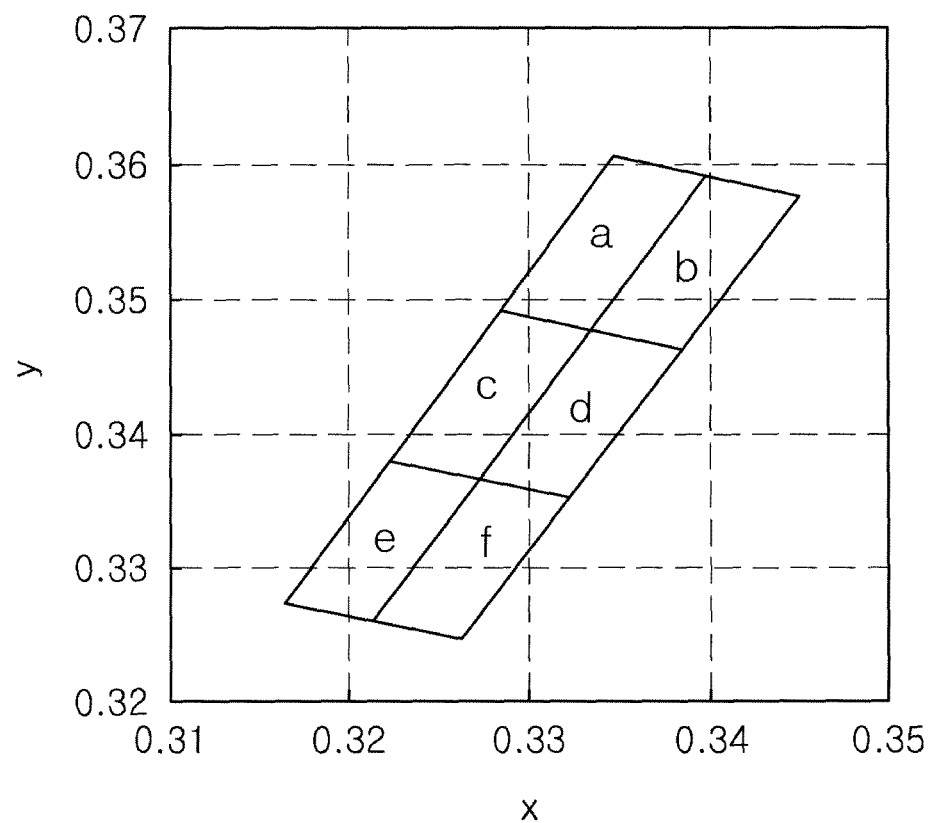
FIG. 8 depicts sub-regions of the CIE 1931 chromaticity diagram according to an example of the present disclosure.

The plurality of color regions may be subdivided into a plurality of sub-color regions and the plurality of color classification regions may be subdivided into a plurality of sub-color classification regions corresponding to the plurality of sub-color regions. As an example of sub-color classification, sub-color classification regions of FIG. 8 may be obtained by subdividing F57 of FIG. 7, i.e., a color classification region corresponding to a color temperature of 5700K. Table 3 shows color coordinates with respect to the sub-color classification regions of F57.

TABLE 3

| Sub-Rank | CIE x | CIE y |
|----------|-------|-------|
| a | 0.3346 | 0.3607 |
|   | 0.3398 | 0.3591 |
|   | 0.3334 | 0.3477 |
|   | 0.3346 | 0.3492 |
| b | 0.3398 | 0.3591 |
|   | 0.3449 | 0.3575 |
|   | 0.3384 | 0.3462 |
|   | 0.3334 | 0.3477 |
| c | 0.3283 | 0.3492 |
|   | 0.3334 | 0.3477 |
|   | 0.3272 | 0.3366 |
|   | 0.3222 | 0.3381 |
| d | 0.3334 | 0.3477 |
|   | 0.3384 | 0.3462 |
|   | 0.3322 | 0.3352 |
|   | 0.3272 | 0.3366 |
| e | 0.3222 | 0.3381 |
|   | 0.3272 | 0.3366 |
|   | 0.3213 | 0.3260 |
|   | 0.3164 | 0.3274 |
| f | 0.3272 | 0.3366 |
|   | 0.3322 | 0.3352 |
|   | 0.3262 | 0.3247 |
|   | 0.3213 | 0.3260 |

As set forth above, according to examples of the disclosure, color regions are set in the CIE 1976 chromaticity diagram in consideration of luminosity levels able to be sensed by humans, and are then converted into color coordinates of the CIE 1931 chromaticity diagram according to measurement criteria to thereby determine classification regions. Therefore, this classification method may allow for precise classification based on actual color differences, while providing light sources having color uniformity in the same classification region.

While the present disclosure has been shown and described in connection with the examples, it will be apparent to those skilled in the art that modifications and variations can be made without departing from the spirit and scope of the disclosure as defined by the appended claims.

What is claimed is:

1. A method of light source classification comprising:
   determining a plurality of color regions in a CIE 1976 chromaticity diagram according to desired classification criteria;
   determining a plurality of color classification regions corresponding to the plurality of color regions through coordinate conversion, thereby allowing the plurality of color regions of the CIE 1976 chromaticity diagram to be converted into the plurality of color classification regions defined by color coordinates of a CIE 1931 chromaticity diagram;
   measuring CIE 1931 color coordinates of light emitted from a light source to be classified; and
   classifying the light source according to one of the plurality of color classification regions, in which the measured CIE 1931 color coordinates are located.

2. The method of claim 1, wherein the determining of the plurality of color classification regions comprises converting coordinates (u', v') defining each of the color regions of the CIE 1976 chromaticity diagram into coordinates (x, y) of the CIE 1931 chromaticity diagram according to equations (1) and (2):

$$u' = \frac{4X}{X + 15Y + 3Z} = \frac{4x}{-2x + 12y + 3} \qquad \text{Equation (1)}$$

$$v' = \frac{9Y}{X + 15Y + 3Z} = \frac{9y}{-2x + 12y + 3} \qquad \text{Equation (2)}$$

wherein X, Y, and Z are coordinates of the color regions of the CIE 1976 chromaticity diagram.

3. The method of claim 1, wherein the determining of the plurality of color regions in the CIE 1976 chromaticity diagram comprises setting variations (Δu', Δv') in coordinates to range from 0.001 to 0.05 in the same color region.

4. The method of claim 1, wherein each of the plurality of color regions in the CIE 1976 chromaticity diagram has a boundary coinciding with or being parallel to a color temperature line or a black body locus, and
   each of the plurality of color classification regions in the CIE 1931 chromaticity diagram is deviated from or is non-parallel to a color temperature line or a black body locus.

5. The method of claim 1, wherein each of the plurality of color regions is subdivided into a plurality of sub-color regions, and
   each of the plurality of color classification regions is subdivided into a plurality of sub-color classification regions corresponding to the plurality of sub-color regions.

6. The method of claim 1, wherein the light source is a white LED device.

7. The method of claim 6, wherein the white LED device includes at least one LED chip emitting light having a first wavelength, and a wavelength conversion material converting the light having the first wavelength into light having a second wavelength.

8. The method of claim 1, wherein the plurality of color classification regions comprise a color classification region corresponding to a color temperature of 6500K, defined by four coordinate points (0.2992, 0.3139), (0.3090, 0.3114), (0.3277, 0.3453) and (0.3175, 0.3484) according to the CIE 1931 chromaticity diagram.

9. The method of claim 1, wherein the plurality of color classification regions comprise a color classification region corresponding to a color temperature of 5700K, defined by four coordinate points (0.3169, 0.3279), (0.3268, 0.3253), (0.3446, 0.3577) and (0.3343, 0.3607) according to the CIE 1931 chromaticity diagram.

10. The method of claim 1, wherein the plurality of color classification regions comprise a color classification region corresponding to a color temperature of 5000K, defined by four coordinate points (0.3305, 0.3395), (0.3405, 0.3366), (0.3610, 0.3721) and (0.3507, 0.3755) according to the CIE 1931 chromaticity diagram.

11. The method of claim 1, wherein the plurality of color classification regions comprise a color classification region corresponding to a color temperature of 4000K, defined by four coordinate points (0.3650, 0.3618), (0.3764, 0.3582), (0.4027, 0.4008) and (0.3908, 0.4051) according to the CIE 1931 chromaticity diagram.

12. The method of claim 1, wherein the plurality of color classification regions comprise a color classification region corresponding to a color temperature of 3500K, defined by four coordinate points (0.3882, 0.3724), (0.4004, 0.3683), (0.4296, 0.4134) and (0.4168, 0.4183) according to the CIE 1931 chromaticity diagram.

13. The method of claim 1, wherein the plurality of color classification regions comprise a color classification region corresponding to a color temperature of 3000K, defined by four coordinate points (0.4116, 0.3831), (0.4261, 0.3780), (0.4575, 0.4243) and (0.4423, 0.4305) according to the CIE 1931 chromaticity diagram.

14. The method of claim 1, wherein the plurality of color classification regions comprise a color classification region corresponding to a color temperature of 2700K, defined by four coordinate points (0.4364, 0.3921), (0.4508, 0.3868), (0.4810, 0.4296) and (0.4661, 0.4358) according to the CIE 1931 chromaticity diagram.

15. A system for light source classification comprising:
a light source; and
a measurement device;
wherein the system is configured to determine a plurality of color regions in a CIE 1976 chromaticity diagram according to desired classification criteria and determine a plurality of color classification regions corresponding to the plurality of color regions; and
the measurement device is configured to measure light emitted from the light source according to CIE 1931 color coordinates wherein the plurality of CIE 1976 color coordinates are converted into CIE 1931 color coordinates such that the light source is classified according to one of the plurality of color classification regions in which the measured CIE 1931 color coordinates are located.

16. The system of claim 15, wherein the measurement device is configured to convert the plurality of color classification regions by converting coordinates (u', v') defining each of the color regions of the CIE 1976 chromaticity diagram into coordinates (x, y) of the CIE 1931 chromaticity diagram according to equations (1) and (2):

$$u' = \frac{4X}{X+15Y+3Z} = \frac{4x}{-2x+12y+3} \qquad \text{Equation (1)}$$

$$v' = \frac{9Y}{X+15Y+3Z} = \frac{9y}{-2x+12y+3} \qquad \text{Equation (2)}$$

wherein X, Y, and Z are coordinates of the color of the CIE 1931 chromaticity diagram.

17. The system of claim 15, wherein the system is further configured to set variations (Δu', Δv') in coordinates in the plurality of color regions in the CIE 1976 chromaticity diagram to range from 0.001 to 0.05 in the same color region set.

18. The system of claim 15, wherein each of the plurality of color regions in the CIE 1976 chromaticity diagram has a boundary coinciding with or being parallel to a color temperature line or a black body locus, and each of the plurality of color classification regions in the CIE 1931 chromaticity diagram is deviated from or is non-parallel to a color temperature line or a black body locus.

19. The system of claim 15, wherein each of the plurality of color regions is subdivided into a plurality of sub-color regions, and each of the plurality of color classification regions is subdivided into a plurality of sub-color classification regions corresponding to the plurality of sub-color regions.

20. The system of claim 15, wherein the light source is a white LED device.

* * * * *